(12) United States Patent
Tsirkin

(10) Patent No.: US 11,588,623 B2
(45) Date of Patent: Feb. 21, 2023

(54) SECURE RELIABLE TRUSTED EXECUTION ENVIRONMENTS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 16/910,600

(22) Filed: Jun. 24, 2020

(65) Prior Publication Data
US 2021/0409199 A1 Dec. 30, 2021

(51) Int. Cl.
*H04L 9/08* (2006.01)
*H04L 9/32* (2006.01)
*G06F 9/445* (2018.01)
*G06F 9/455* (2018.01)

(52) U.S. Cl.
CPC ............ *H04L 9/0819* (2013.01); *G06F 9/445* (2013.01); *G06F 9/45558* (2013.01); *H04L 9/0894* (2013.01); *H04L 9/3226* (2013.01); *G06F 2009/45587* (2013.01)

(58) Field of Classification Search
CPC ... H04L 9/0819; H04L 9/0894; H04L 9/3226; G06F 9/445; G06F 9/45558; G06F 2009/45587
USPC .......................................................... 713/168
See application file for complete search history.

(56) References Cited

U.S. PATENT DOCUMENTS

| | | | | |
|---|---|---|---|---|
| 2016/0350535 A1* | 12/2016 | Garcia | .................. | G06F 21/572 |
| 2018/0137299 A1* | 5/2018 | Porter | .................. | G06F 21/6245 |
| 2019/0155956 A1* | 5/2019 | Kesarwani | .......... | H04L 63/0428 |
| 2019/0312939 A1* | 10/2019 | Noble | .................... | G06F 21/602 |
| 2020/0380149 A1* | 12/2020 | Ramesh | ................ | H04L 9/0866 |
| 2021/0091952 A1* | 3/2021 | Wentz | .................... | H01L 23/573 |

OTHER PUBLICATIONS

Yan Zhai, Qiang Cao, Jeffrey Chase, Michael Swift; "TapCon: Practical Third-Party Attestation for the Cloud" University of Wisconsin Madison, Duke University; Accessed Date: Mar. 11, 2020; 7 Pages.

Mingliang Pei, Hannes Tschofenig, David Wheeler, Andrew Atyeo, Liu Dapeng; "Trusted Execution Environment Provisioning (TEEP) Architecture"; Oct. 23, 2018; 18 Pages.

\* cited by examiner

*Primary Examiner* — Kambiz Zand
*Assistant Examiner* — Phuc Pham
(74) *Attorney, Agent, or Firm* — K&L Gates LLP

(57) ABSTRACT

A system includes an application TEE and a first cloud service of a trusted cloud provider. The first cloud service is configured to receive an encrypted disk image and to launch the application TEE. The system also includes a second cloud service of a first alternate cloud provider, which is configured to launch a first attestation service instance from an attestation disk image that includes a secret and to provide the secret to the application TEE instance. Additionally, the system includes a third cloud service of a second alternate cloud provider, which is configured to launch a second attestation service instance and to provide the secret to the application TEE instance when the second cloud service is unavailable.

20 Claims, 9 Drawing Sheets

SECURE RELIABLE TRUSTED EXECUTION ENVIRONMENTS

BACKGROUND

Trusted execution environments, such as trusted virtual machines may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

Trusted execution environments may include containers, enclaves and virtual machines. Virtualization may be achieved by running a software layer, often referred to as a hypervisor, above the hardware and below the trusted execution environment, such as guest virtual machines or containers. A hypervisor may run directly on the server hardware without an operating system beneath it or as an application running on a traditional operating system. A hypervisor may virtualize the physical layer and provide interfaces between the underlying hardware and trusted execution environments. In some cases, the trusted execution environments may be encrypted for security purposes. Additionally, validation or attestation of launched trusted execution environments may occur for security purposes.

SUMMARY

The present disclosure provides new and innovative systems and methods for secure and reliable launching of trusted execution environments, such as virtual machines ("VMs"), containers and enclaves. In an example, a system includes an application trusted execution environment ("TEE") instance and a first cloud service of a trusted cloud provider. The first cloud service is configured to receive an encrypted disk image and the trusted cloud provider has access to the encrypted disk image. The first cloud service is also configured to launch the application trusted execution environment (TEE) instance. The system also includes a second cloud service of a first alternate cloud provider, which is configured to launch a first attestation service instance from an attestation disk image. The attestation disk image includes a secret, and the first alternate cloud provider has access to the secret. The second cloud service is also configured to provide the secret to the application TEE instance. Additionally, the system includes a third cloud service of a second alternate cloud provider, which is configured to launch a second attestation service instance from the attestation disk image. The attestation disk image includes the secret, and the second alternate cloud provider has access to the secret. The third cloud service is also configured to provide the secret to the application TEE instance. One of the second cloud service and the third cloud service provide the secret to the application TEE instance when the other of the second cloud service and third cloud service is unavailable.

In an example, a method includes uploading an encrypted disk image to a first cloud service of a trusted cloud provider. Additionally, the trusted cloud provider has access to the encrypted disk image. The method also includes launching an application trusted execution environment (TEE) instance on the first cloud service of a trusted cloud provider. Additionally, the method includes launching a first attestation service instance from an attestation disk image on a second cloud service of a first alternate cloud provider. The attestation disk image includes a secret, and the first alternate cloud provider has access to the secret. The method also includes launching a second attestation service instance from the attestation disk image on a third cloud service of a second alternate cloud provider. The attestation disk image includes the secret, and the second alternate cloud provider has access to the secret. Additionally, the method includes providing, by one of the second cloud service and the third cloud service, the secret to the application TEE instance when the other of the second cloud service and third cloud service is unavailable.

In an example, a method includes receiving, by a cloud service of a trusted cloud provider, an encrypted disk image and launching, by the cloud service, an application trusted execution environment (TEE) instance. The method also includes launching, by a first cloud service of a plurality of cloud services of at least one alternate cloud provider, a first attestation service instance from an attestation disk image. The attestation disk image includes a first portion of a secret. Additionally, the method includes launching, by a second cloud service of the plurality of cloud services of the at least one alternate cloud provider, a second attestation service instance from the attestation disk image. The attestation disk image includes a second portion of the secret. The method also includes providing, by the first cloud service, the first portion of the secret to the application TEE instance and providing, by the second cloud service, the second portion of the secret to the application TEE instance.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
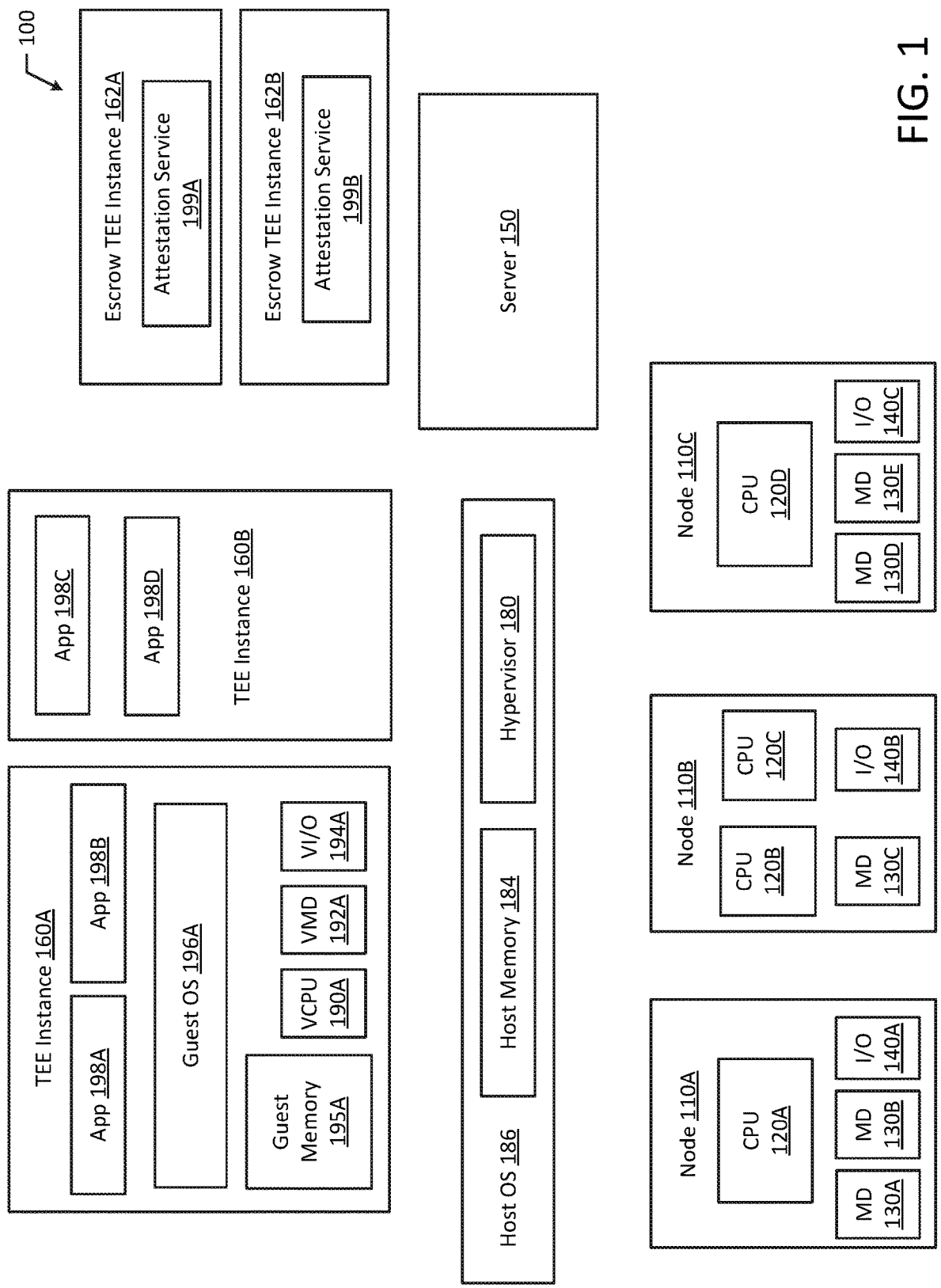
FIG. 1 illustrates a block diagram of an example computer system according to an example embodiment of the present disclosure.

Techniques are disclosed for providing secure and reliable trusted execution environments ("TEEs"), such as a virtual machines ("VMs"), containers and enclaves. Modern hardware supports trusted execution environment ("TEE") techniques where a supervisor of a host computer does not have access to memory of a specific TEE, such as a trusted container, a trusted virtual machine, or a trusted software enclave running on the host computer. For example, the supervisor may lack access to the memory of the TEE because the memory is protected by host hardware or host firmware. Memory encryption is one such technique to protect the memory of the TEE. In an example, encrypted memory may be used to support and protect running sensitive workloads in the cloud.

Launching a TEE instance, such as a trusted container, by a cloud provider typically involves using a secret that is private to the TEE instance owner and unavailable to the cloud provider. For example, a disk image of the TEE instance (e.g., disk image of the trusted container) may be encrypted with a secret key. However, providing this secret to the TEE instance (e.g., trusted container) presents a challenge. One way to provide the secret to the TEE instance is by having the host hardware or the host firmware first provide a measurement (e.g., cryptographic measurement) of the TEE instance owner. The measurement (e.g., cryptographic measurement) may be used for attestation or validation to ensure that the TEE instance runs under a trusted environment and is protected from the supervisor or hypervisor. After verifying that the TEE instance runs under a trusted environment and is protected from the supervisor or hypervisor, the TEE instance owner's secret is encrypted and forwarded to the TEE instance. For example, the secret may be provided to a trusted container in an encrypted form and in a container specific way.

However, providing the secret to the TEE instance in this way typically requires the TEE instance owner to maintain a service (e.g., attestation service) for verifying the measurement and providing the encrypted secret. Additionally, the service (e.g., attestation service) is typically required to be accessible to the cloud provider, but outside of the cloud provider's control. In an example, the service is envisioned to be hosted on the TEE instance owner's private cloud. However, hosting the service on the TEE instance owner's private cloud is inappropriate for workloads that launch and shut down TEE instances (e.g., trusted containers) at a high rate. For example, should the private cloud become unavailable, the ability to launch new TEE instances would become unavailable. Additionally, if the private cloud slows down and in unable to serve requests, the ability to launch new TEE instances would be halted and unavailable until the private cloud is again able to serve requests.

Providing attestation through a private cloud often requires that the TEE instances are not treated as "cattle" where they are started up and shut down at will. Instead, the TEE instances are treated as "pets" and carefully migrated live without shutting down. However, live migration increases costs for the cloud providers and the TEE instance owners. For example, treating the TEE instances as "pets" that are migrated live increases hardware utilization and creates additional overhead (e.g., due to successive iterations of memory pre-copying that consumes extra CPU cycles on both source and destination servers).

Another technique for providing attestation services to TEEs is to use a quoting TEE instance (e.g., quoting enclave) that runs on the same platform as the TEE instances (e.g., enclaves) being attested. The quoting enclave provides attestation services to the application enclaves by signing their attestation reports. For example, the quoting enclave may verify attestation reports for the platform and the quoting enclave may hold the platforms attestation key. In an example, multiple attesting enclaves may create respective attestation reports for the quoting enclave and the quoting enclave verifies the report and signs the report with the attestation key. Then, off-platform tenants may go through a verification process to obtain the attestation information. For example, the verification of a quote by an off-platform tenant involves verifying that a Provisioning Certification Key ("PCK") embedded in the quote is valid. For example, verification of the quote may be achieved by using the PCK certificate chain obtained from a manufacturer associated with the enclave (e.g., Intel as a SQX processor that utilizes the quoting enclaves). SQX may refer to an encoding, video and/or compression technology. Then, verifying the key associated with the PCK certification is the one that signed the platform's attestation key (e.g., signed the hash of the platform's attestation key). Verification of the quote includes verifying that the attestation key was the one that signed the quote and also verifying that the hash of the attestation key embedded in the quote is correct.

To provide secure and reliable TEEs, a guest owner may host a TEE with a trusted cloud provider by uploading an encrypted disk image to the cloud provider. Instead of self-hosting an attestation service, the owner hosts the attestation service in a public cloud with an alternate cloud provider. The attestation service can launch from an attestation disk image including a secret (e.g., a disk encryption key). The attestation disk image does not need to be encrypted since it does not give access to the actual disk image and instead gives access to just the secret. In this way, no single cloud provider has access to both the disk image and the secret. For example, the trusted cloud provider has access to the encrypted image but not the secret. Additionally, the alternate cloud provider has access to the secret but not the encrypted image. By restricting access to the both the disk image and the secret to any single cloud provider, security is advantageously improved. To further improve availability, multiple alternate cloud providers may be used. Additionally, a secret sharing scheme may be implemented to further improve security. For example, the secret may be divided into "n" pieces where any "k" pieces (i.e., "k" is less than or equal to "n") may be sufficient to retrieve the secret. For example, any "k" of "n" alternate cloud providers may provide an attestation service and provide its own piece of the secret to the TEE running on the trusted cloud provider. The TEE may then use the pieces to the retrieve the secret and complete start-up.

Since multiple attestation services on a public cloud and/or multiple attestation services from a plurality of public clouds may each validate an application TEE instance, the configuration of the systems and methods disclosed herein includes various attestation options, which has no single point of failure (e.g., one of the attestation services or one of the alternate cloud services going offline or slowing down). Conversely, multiple attestation services may be available from one or more alternate cloud providers at the same time such that if one of the attestation services crashes or goes off-line, another attestation service may assume the responsibility of validating (e.g., attesting) newly launched TEE instances. Secrecy, security and reliability may be further enhanced by secret sharing. Secret sharing further reduces failure points because even if one of the attestation services fails or is infiltrated or subverted by an attacker, another attestation service can validate the application TEE instance and provide the secret (or portion of the secret).

Instead of having attestation services exclusively or fully run in a private cloud, TEEs such as escrow containers may be used to provide attestation services on various alternate clouds. For example, without solely relying on and maintaining an attestation service in a private cloud, the private cloud is protected from continuous security threats while validating (e.g., attesting) launched applications because access to the private cloud may be disabled after launching an escrow TEE instance (e.g., application TEE instance with clone service). For example, while providing attestation services, the private cloud may be vulnerable to attacks from various applications (e.g., application TEE instances) requesting validation to complete start-up. Furthermore, running attestation services that maintain secrets and/or keys (or a portion of the secret and/or key) eliminates the need of live migration, reduces the reliance on private cloud attestation services, eliminates the numerous verification steps associated with quoting enclaves, and improves the latency of launching TEE instances (e.g., containers, virtual machines or enclaves). Further, the attestation techniques described herein may be extended to any kind of TEE, making it completely independent for specific hardware (e.g., encrypted VMs can also be supported), which allows running elastic applications that treat containers like "cattle", with encryption, providing a secrecy to any required degree (e.g., with secret sharing) without sacrificing performance and through the use and convenience of public clouds.

The advantages and features discussed above are especially important for cloud vendors as these advantages and features add value compared to private cloud solutions. For example, vendors using a hypervisor (e.g., Kernel-based Virtual Machine ("KVM")) on an operating system, such as Red Hat® Enterprise Linux® ("RHEL") may utilize the systems and methods disclosed herein to preserve privacy, improve security, and improve reliability while performing introspection services for TEEs. When handling network traffic (e.g., network traffic from a cloud-computing platform such as the Red Hat® OpenStack® Platform), hypervisor vendors and operating system ("OS") vendors often attempt to improve security to prevent malicious memory accesses. An example vendor is Red Hat®, which offers RHEL. By providing introspection services while maintaining privacy for TEEs, security and reliability may be improved.

FIG. 1 depicts a high-level component diagram of an example computing system 100 in accordance with one or more aspects of the present disclosure. The computing system 100 may include an operating system (e.g., host OS 186), one or more TEEs (e.g., TEE instances 160A-B and escrow TEE instances 162A-B), a cloud provider (e.g., server 150), and nodes (e.g., nodes 110A-C).

An application TEE instance (e.g., TEE instance 160A) may be a virtual machine, container, enclave, etc. and may include a guest OS, guest memory, a virtual CPU (VCPU), virtual memory devices (VMD), and virtual input/output devices (VI/O). For example, TEE instance 160A may include guest OS 196A, guest memory 195A, a virtual CPU 190A, a virtual memory devices 192A, and virtual input/output device 194A. Virtual machine memory 195A may include one or more memory pages. Similarly, TEE instance 160B may include a guest OS, guest memory, a virtual CPU, virtual memory devices, and virtual input/output devices.

The computing system 100 may also include a supervisor or hypervisor 180 and host memory 184. The supervisor or hypervisor 180 may manage host memory 184 for the host operating system 186 as well as memory allocated to the TEEs (e.g., TEE instances 160A-B and escrow TEE instances 162A-B) and guest operating systems (e.g., guest OS196A such as guest memory 195A provided to guest OS 196A. Host memory 184 and guest memory 195A may be divided into a plurality of memory pages that are managed by the supervisor or hypervisor 180. Guest memory 195A allocated to the guest OS 196A may be mapped from host memory 184 such that when an application 198A-D uses or accesses a memory page of guest memory 195A, the guest application 198A-D is actually using or accessing host memory 184.

In an example, a TEE instance (e.g., TEE instance 160A-B), such as a virtual machine, container or enclave may execute a guest operating system 196A and run applications 198A-B which may utilize the underlying VCPU 190A, VMD 192A, and VI/O device 194A. One or more applications 198A-B may be running on a TEE, such as virtual machine, under the respective guest operating system 196A. TEEs (e.g., TEE instances 160A-B and escrow TEE instances 162A-B, as illustrated in FIG. 1) may run on any type of dependent, independent, compatible, and/or incompatible applications on the underlying hardware and OS. In an example, applications (e.g., App 198A-B) run on a TEE, such as a virtual machine, and may be dependent on the underlying hardware and/or OS 186. In another example, applications 198A-B run on a TEE, such as a virtual machine, and may be independent of the underlying hardware and/or OS 186. For example, applications 198A-B running on a first TEE instance 160A may be dependent on the underlying hardware and/or OS 186 while applications (e.g., application 198C-D) running on a second TEE instance 160B are independent of the underlying hardware and/or OS 186A. Additionally, applications 198A-B running on TEE instance 160A may be compatible with the underlying hardware and/or OS 186. In an example, applications 198A-B running on a TEE instance 160A may be incompatible with the underlying hardware and/or OS 186.

The cloud provider (e.g., server 150) may be a trusted cloud provider. In another example, the cloud provider may be an alternate cloud provider. The system 100 may interact with both a trusted cloud provider and alternate cloud provider(s). In an example, the alternate cloud provider(s) may be one or more public clouds.

As mentioned above, the escrow TEE instance(s) 162A-B may include attestation services 199A-B that validate application TEE instances 160A-B. Once validated, the application TEE instances 160A-B may complete start-up. For example, the escrow TEE instances 162A-B and/or the attestation services 199A-B may provide the newly started application TEE instance 160A-B with a secret, key or key-secret pair. The escrow TEE instances 162A-B and/or the attestation services 199A-B may also provide portions of the secret, key or key-secret pair, which may be used along with other portions to recover the full secret, key or key-secret pair. Additional details of the configuration of the escrow TEE instances 162A-B and the type of secret scheme used (e.g., partial secrets or entire secrets) is described in more detail in FIG. 2A and FIG. 2B.

The escrow TEE instance(s) 162A-B may be enclaves that provide validation (e.g., attestation) services for containers or virtual machines. In another example, the escrow TEE instance(s) 162A-B may be virtual machines that provide validation (e.g., attestation) services for containers or enclaves. Therefore, the system advantageously provides additional security while launching TEE instance(s) without requiring the escrow TEE instance(s) 162A-B to run on the same platform as the application TEE instance(s) 160A-B being launched, which provides additional flexibility while maintaining security. For example, the systems and methods described herein do not rely on the platform to provide security, which is typically required when using quoting enclaves. Furthermore, using a quoting enclave requires contacting the tenant to perform the validation, which as described above, may pose a problem if the tenant is unable to be reached (e.g., tenant's attestation services going offline or slowing down).

The server 150 may include hardware, such as processor(s), memory, hard drives, network adapters for network connection, etc. For example, server 150 may include many of the same hardware components as nodes 110A-C.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. TEE instances 160A-B may be provisioned on the same host or node (e.g., node 110A) or different nodes. For example, TEE instance 160A and TEE instance 160B may both be provisioned on node 110A. Alternatively, TEE instance 160A may be provided on node 110A while TEE instance 160B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2A:
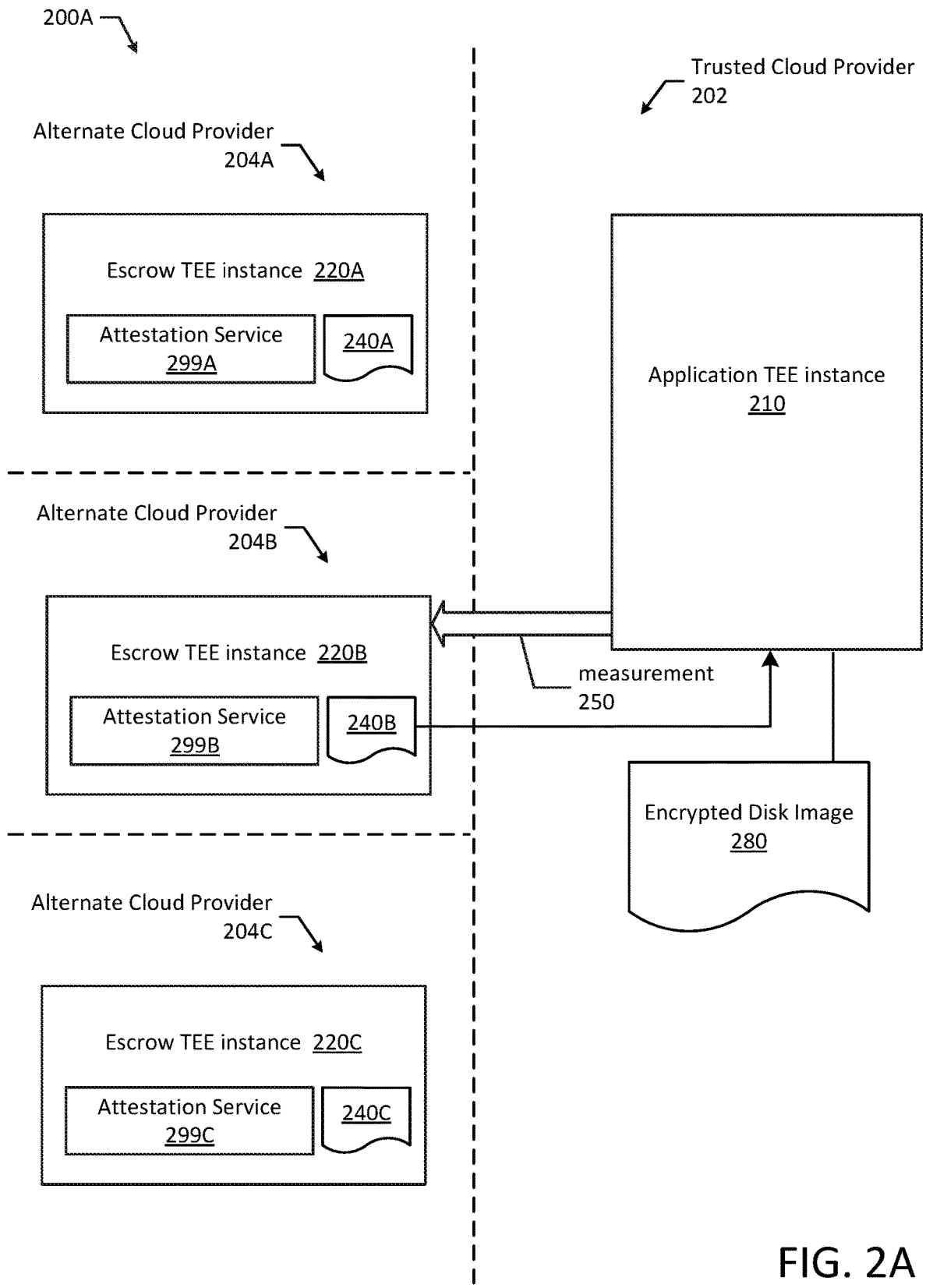
FIG. 2A illustrates a block diagram of an example secure TEE attestation system according to an example embodiment of the present disclosure.

FIG. 2A illustrates a block diagram of a secure TEE attestation system 200A for launching TEE instances. As illustrated in FIG. 2A, an application or an application TEE instance 210 may be launched on a trusted cloud of a trusted cloud provider 202. For example, an encrypted disk image 280 may be uploaded to a cloud service of the trusted cloud provider 202. In an example, an application may include multiple TEE instances. For example, an application may consist of a number of trusted application containers. The trusted cloud provider 202, such as server 150, may launch the TEE instance 210.

Similarly, one or more escrow TEE instances 220A-C may be launched to provide validation (e.g., attestation) services to the newly started application instances (e.g., application TEE instance 210). In an example, the trusted escrow TEE instances 220A-C may have already been launched. The trusted escrow TEE instances 220A-C may be launched and hosted by one or more alternate cloud providers 204A-C. For example, as illustrated in FIG. 2A, the alternate cloud provider 204A may launch the escrow TEE instance 220A, alternate cloud provider 204B may launch escrow TEE instance 220B, and alternate cloud provider 204C may launch escrow TEE instance 220C. In another example, each of the escrow TEE instances 220A-C may be launched on the same alternate cloud provider 204. The alternate cloud provider(s) 220A-C, hereinafter referred to generally as alternate cloud provider 220, may be a public cloud.

Each of the escrow TEE instances 220A-C may include a respective attestation service 299A-C and may be provisioned with a respective secret 240A-C. The respective secrets 240A-C may be provided on an attestation disk image. For example, the attestation services 299A-C may launch from a respective attestation disk image that includes the secret 240 (e.g., a disk encryption key). Each secret 240A-C may be an identical secret such that any of the escrow TEE instances 220A-C may validate (e.g., provide attestation services) to the application TEE instance 210.

After the escrow TEE instance 220 (e.g., escrow TEE instance 220B) is provisioned with the secret 240B, the escrow TEE instance 220 may obtain a cryptographic measurement 250 associated with the application TEE instance 210. Based on the cryptographic measurement 250, the escrow TEE instance 220 (e.g., escrow TEE instance 220B) may validate the application TEE instance 210 (e.g., by comparing the cryptographic measurement 250 to a reference measurement or an integrity record).

Figure 2B:
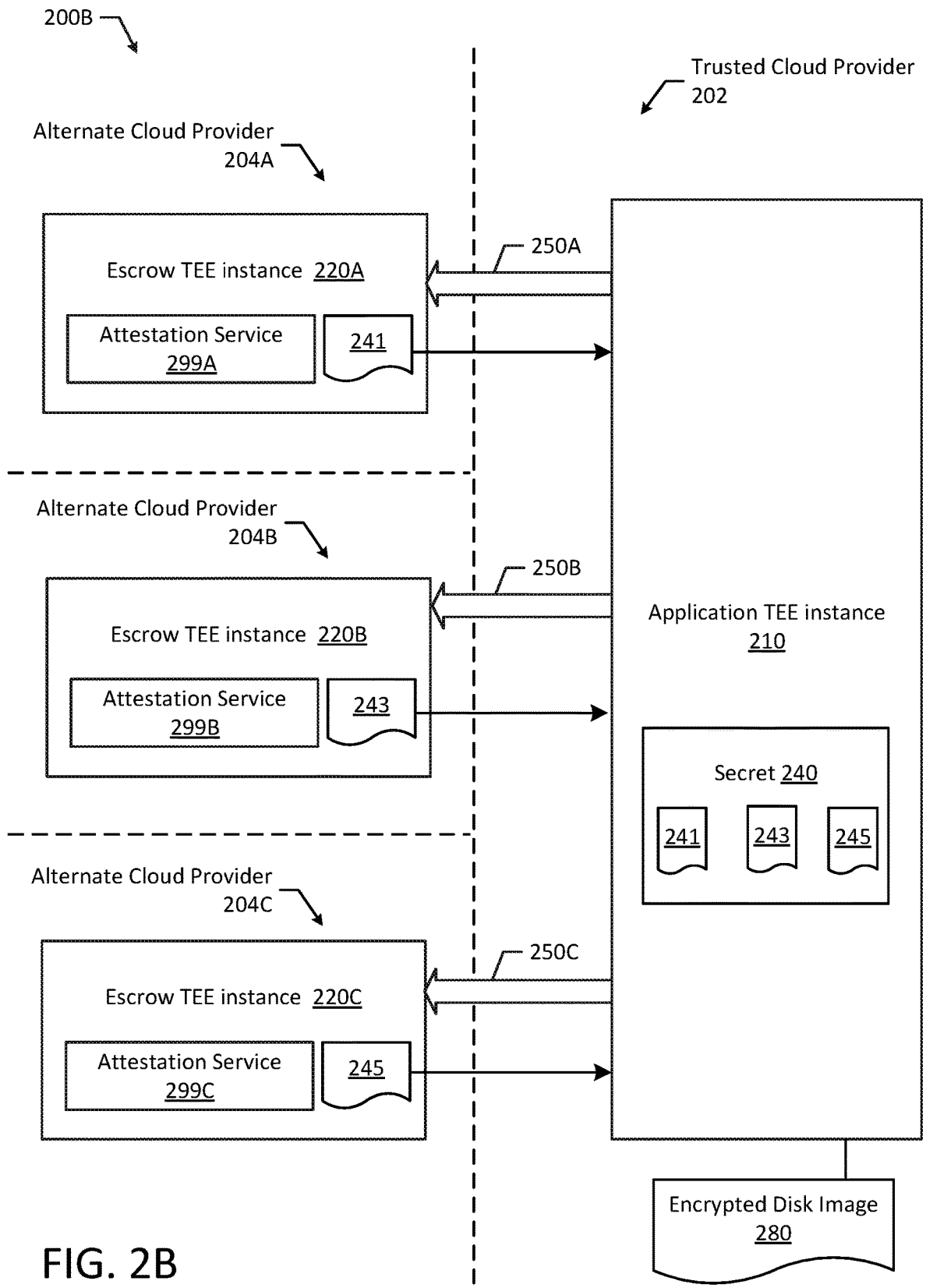
FIG. 2B illustrates a block diagram of an example secure TEE attestation system according to an example embodiment of the present disclosure.

After validation, the escrow TEE instance 220 (e.g., escrow TEE instance 220B) may provide the secret 240B to the application TEE instance 210. Once the escrow TEE instance 220 (e.g., escrow TEE instance 220B) provides the key or secret 240B to the application TEE instance 210, the application TEE instance 210 can finish launching. The validation process between the escrow TEE instance 220 and the application TEE instance 210 may be performed by the attestation service 299 (e.g., attestation service 299B). As illustrated in FIG. 2B, none of the cloud providers (e.g., alternate cloud providers 204A-C or trusted cloud provider 202) have access to both the encrypted disk image 280 and the secret (e.g., secrets 240A-C). For example, initially the trusted cloud provider 202 has access to the encrypted disk image 280, but not the secret 240. For example, the trusted cloud provider 202 has access the encrypted disk image 280, which it may use to launch an application TEE instance 210. The alternate cloud providers 204A-C initially have access to the secret 240, but not the encrypted disk image 280. For example, an alternate cloud provider 204 may have access to an attestation disk image, which gives the alternate cloud provider 204 access to the secret 240. The secret 240 or access to the secret 240 may be provided after validation or attestation occurs. By splitting access between the trusted cloud provider 202 and the alternate cloud providers 204A-C, instead of providing access to both the secret 240 and the encrypted disk image 280 together, security is advantageously improved. Furthermore, the secret 240 may be configured such that saving the secret 240 in a separate location is prohibited. For example, after the secret 240 is used to finalize start-up of the application TEE instance 210, the trusted cloud provider 202 may no longer have access to the secret 240. If another application TEE instance 210 is to be launched, another validation or attestation process may be required to again gain access to the secret 240.

For example, as illustrated in FIG. 2A, several escrow TEE instances 220A-C hold secrets 240A-C for launching application TEE instance(s) 210 such that if one of the escrow TEE instances 220 goes offline, another escrow TEE instance may validate application TEE instance 210 in its place. Instead of entirely running the attestation services or validation services in a single private cloud, attestation services 299A-C may run on a number of escrow TEE instances 220A-C, which provides high availability without reducing security. For example, multiple escrow TEE instances 220A-C may provide attestation services to application TEE instances 210. The escrow TEE instances 220A-C may be hosted by alternate cloud providers 204A-C, which may be one or more public clouds.

FIG. 2B illustrates a block diagram of a secure TEE attestation system 200B for launching TEE instances. The secure attestation system 200B may include each of the same components as secure attestation system 200A. However, instead of each escrow TEE instance being provisioned with a full secret 240A-C, the escrow TEE instances 220A-C each hold a respective portion of the secret 240. For example, escrow TEE instance 220A may be provisioned with portion 241, while escrow TEE instance 220B is provisioned with portion 243 and escrow TEE instance 220C is provisioned with portion 245. The portions 241, 243 and 245 of the secret may be configured such that any two portions of the secret 240 are sufficient to recover the entire secret 240.

The secret may be divided into "n" pieces where any "k" pieces (i.e., "k" is less than or equal to "n") may be sufficient to retrieve the secret. For example, any "k" of "n" alternate cloud providers may provide an attestation service and provide its own piece of the secret to the TEE running on the trusted cloud provider. The secret sharing may operate according to "Shamir's Secret Sharing" which is an algorithm where a secret 240 is divided into parts, giving each participant (e.g., escrow TEE instance or attestation service) its own unique part. To reconstruct or recover the original secret 240, a minimum number of parts or portions is required. The minimum number of parts or portions is less than the total number of parts or portions.

The minimum number of parts or portions required to reconstruct or recover the secret, hereinafter referred to as a threshold, may be known when the secret 240 is divided. For example, if the secret 240 is divided into three parts (as illustrated in FIG. 2B), the threshold may be two parts, such that any two parts are sufficient to recover the original secret 240. For example, the secret may be recovered from portion 241 and 243, portions 241 and 245, or portions 243 and 245. The application TEE instance 210 may try to recover the secret 240 regardless of the quantity of portions it receives. In another example, the application TEE instance may be notified of the threshold and may recover the secret 240 once the threshold of portions (e.g., portions 241 and 243) are received. The secret sharing scheme (e.g., amount of division and threshold) may be pre-agreed between each party and may form part of a protocol. In another example, the application TEE instance 210 may receive more than the required portions (e.g., portions 241 and 243) of the secret 240, in which case the additional portions (e.g., portion 245) may be ignored.

Multiple escrow TEE instances 220 may obtain a respective cryptographic measurement 250A-C associated with the application TEE instance 210. Based on the cryptographic measurements 250A-C, the escrow TEE instances 220A-C may validate the application TEE instance 210 (e.g., by comparing the respective cryptographic measurements 250A-C to a reference measurement or an integrity record).

After validation, the escrow TEE instances 220A-C may provide their respective portions (e.g., portions 241, 243, and 245) of the secret 240 to the application TEE instance 210. Once the escrow TEE instances 220A-C provide the portions of the key or secret 240 to the application TEE instance 210, the application TEE instance 210 may recover the entire secret 240. Once the secret 240 is recovered, the application TEE instance 210 can finish launching. The validation process between the escrow TEE instances 220A-C and the application TEE instance 210 may be performed by the attestation services 299A-C.

Referring to both FIG. 2A and FIG. 2B, measurements 250A-C described above may be cryptographic measurements that identify characteristics of the application TEE instance(s) 210 such as the type of application TEE instance 210, version of the TEE instance 210, description of software components loaded into the TEE instance 210, etc. Additional examples of cryptographic measurements are described in more detail below.

As illustrated in FIG. 2A and FIG. 2B, instead of continually providing access to the trusted cloud provider 202 (e.g., private cloud) for performing attestation services, which may expose the trusted cloud provider 202 (e.g., private cloud) to additional malicious entities, attestation is performed by one or more attestation services 299A-C hosted by alternate cloud providers 204A-C (e.g., public clouds). The malicious entities may include a malicious hypervisor or malicious application TEE instances, which may endanger other services hosted by the trusted cloud provider 202 (e.g., private cloud) if the trusted cloud provider 202 also performed attestation.

By restricting access to both the encrypted disk image 280 and the secret 240 to any single cloud provider, security is advantageously improved. The increased security may however make the setup more brittle as new TEEs may not be launched if the alternate cloud provider 204A-C is down. Therefore, to improve availability, multiple alternate cloud providers 204A-C may be used. Additionally, a secret sharing scheme, as illustrated in FIG. 2B, may be implemented to further improve security. Therefore, the trusted cloud provider 202 (e.g., private cloud) is protected from malicious attacks. Additionally, if an attack is detected while using one attestation service (e.g., attestation service 299B), that service may be avoided and validation may be performed through other secure attestation services. More specifically, a compromised attestation service (e.g., attestation service 299B) may be disabled, shut-down or marked for removal from the pool of available attestation services 299A-B. Once an attestation service (e.g., attestation service 299B) is disabled or removed, a new attestation service may be launched or a new instance of the disabled attestation service (e.g., attestation service 299B) may be started.

The configuration of the systems 200A-B illustrated in FIG. 2A and FIG. 2B include various attestation options, which have no single point of failure (e.g., one of the attestation services 299A-C or one of the alternate cloud providers 204A-C going offline or slowing down). For example, multiple attestation services 299A-C may be available from one or more alternate cloud providers 204A-C at the same time such that if one of the attestation services (e.g., attestation service 299C) crashes or goes off-line, another attestation service (e.g., attestation service 299B) may assume the responsibility of validating (e.g., attesting) newly launched application TEE instances 210.

As discussed above, instead of having attestation services 299A-C exclusively or fully hosted by a trusted cloud provider 202 (e.g., run in a private cloud), TEEs such as escrow TEE instances 220A-C may be used to provide attestation services on various alternate clouds. By doing so the private cloud is protected from continuous security threats while validating (e.g., attesting) launched applications because access to the private cloud may be disabled after launching an escrow TEE instance 220A-C. For example, while providing attestation services, the trusted cloud provider 202 (e.g., private cloud) may be vulnerable to attacks from various applications (e.g., application TEE instances 210) requesting validation to complete start-up. Furthermore, running attestation services 299A-C that maintain secrets 240A-C (or portions 241, 243, and 245 of secrets 240) and/or keys (or a portion of the secret and/or key) eliminates the need of live migration, reduces the reliance on private cloud attestation services, eliminates the numerous verification steps associated with quoting enclaves, and improves the latency of launching TEE instances (e.g., containers, virtual machines or enclaves).

When receiving a request to start an application TEE instance 210, an escrow TEE instance (e.g., escrow TEE instance 220A) may also be launched and provisioned with a secret (e.g., secret 240A) if a respective escrow TEE instance is not already running. Alternatively, the escrow TEE instance (e.g., escrow TEE instance 220A) may be a previously launched escrow TEE instance. For example, once the escrow TEE instance (e.g., escrow TEE instance 220A) is launched and running, the escrow TEE instance may validate (e.g., perform attestation) for newly launched application TEE instances 210.

As mentioned above, along with the additional benefits of increased security, the escrow TEE instances 220A-C also eliminate the need of live migration. For example, the application TEE instances 210 as well as the escrow TEE instances 220 may be killed or shut-down at will at a migration source and may be restarted at a migration destination. Once started at the migration destination, the application TEE instances 210 may be validated through attestation services 299A-C hosted by alternate cloud providers on a public cloud.

The escrow TEE instances 220A-C do not have to run on the same platform as the application TEE instances 210 being launched since the escrow TEE instances 220A-C do not rely on the platform to provide security. In contrast, other solutions such as the quoting enclave example described above rely on the platform to provide security and the tenant needs to be contacted to have the tenant verify the attestation and supply the secret. Lastly, the systems and methods described herein do not require any special machinery for the escrow TEE instance (e.g., escrow container) because the escrow TEE instance 220A-C is a trusted TEE instance, like the application TEE instance 210 or any other trusted TEE instance, and is treated as such. Further, the attestation techniques described herein may be extended to any kind of TEE, making it completely independent for specific hardware (e.g., encrypted VMs can also be supported), which allows running elastic applications that treat containers like "cattle", with encryption, providing secrecy to any required degree (e.g., with secret sharing) without sacrificing performance and through the use and convenience of public clouds.

Figure 3:
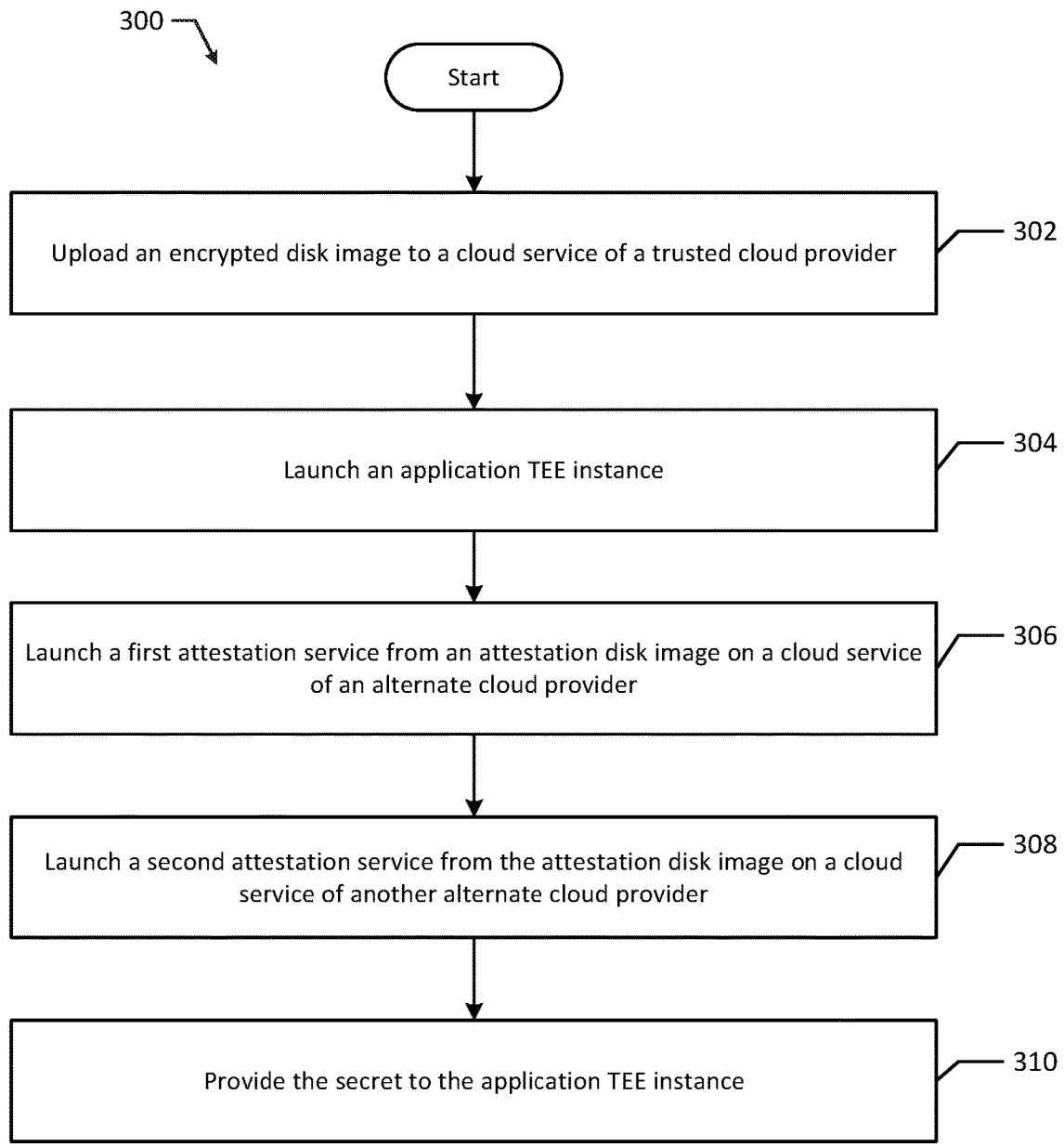
FIG. 3 illustrates a flowchart of an example process for secure and reliable launching of TEEs according to an example embodiment of the present disclosure.

FIG. 3 illustrates a flowchart of an example method 300 for secure and reliable launching of TEEs in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes uploading an encrypted disk image to a cloud service of a trusted cloud provider (block 302). For example, an encrypted disk image 280 may be uploaded to a first cloud service of a trusted cloud provider 202. Additionally, the trusted cloud provider 202 may have access to the encrypted disk image 280. While the encrypted disk image 280 is available to the trusted cloud provider 202, access to the encrypted disk image 280 is restricted from other alternate cloud providers. 204A-C. The method 300 also includes launching an application TEE instance (block 304). For example, an application TEE instance 210 may be launched on the first cloud service of the trusted cloud provider 202. The first cloud service may be a private cloud. It should be appreciated that application TEE instance 210 of FIGS. 2A and 2B may represent TEE instance(s) 160A or 160B of FIG. 1, which may each be referred to generally as application TEE instance 210.

Additionally, method 300 includes launching a first attestation service from an attestation disk image on a cloud service of an alternate cloud provider (block 306). For example, a first attestation service instance 299A may be launched from an attestation disk image on a second cloud service of a first alternate cloud provider 204A. The attestation disk image may include a secret 240A and the first alternate cloud provider 204A may have access to the secret. However, the secret 240A is unavailable to the trusted cloud provider 202. For example, the trusted cloud provider 202 may be restricted from accessing the secret 240A.

Method 300 also includes launching a second attestation service from the attestation disk image on a cloud service of another alternate cloud provider (block 308). For example, a second attestation service 299B instance may be launched from the attestation disk image on a third cloud service of a second alternate cloud provider 204B. The attestation disk image may include the secret 240B and the second alternate cloud provider 204B may have access to the secret. Secrets 240A and 240B may be the same secret. For example, each alternate cloud provider 204B may host respective escrow TEE instances 220A-B that run attestation services 299A-B and provide secrets 240A-B after validating an application TEE instance 210. In another example, the first and second alternate cloud providers 240A-B may be the same cloud provider that hosts several escrow TEE instances 220A-B on the same public cloud. It should be appreciated that escrow TEE instances 220A-B of FIG. 2 may represent escrow TEE instances 162A-B of FIG. 1, which may each be referred to generally as escrow TEE instance 220.

Additionally, method 300 includes providing the secret to the application TEE instance (block 310). For example, the second cloud service or the third cloud service may provide the secret (e.g., secret 240A-B) to the application TEE instance 210. The second cloud service may provide the secret 240A when the third cloud service is unavailable. Alternatively, the third cloud service may provide the secret 240B when the second cloud service is unavailable. In an example, the secret (e.g., secret 240A-B) may be provided by the corresponding escrow TEE instances 204A-B. More specifically, the secrets (e.g., secret 240A-B) may be provided by the corresponding attestation services 299A-B of the escrow TEE instances 204A-B.

Prior to providing the secret (e.g., secret 240A-B) to the application TEE instance 210, at least one attestation service (e.g., attestation service 299B) may validate the application TEE instance 210. The escrow TEE instance 220B or its associated attestation service 299B may validate application TEE instance 210 by obtaining a cryptographic measurement associated with the application TEE instance 210. For example, the escrow TEE instance 220B or its associated attestation service 299B may obtain a cryptographic measurement associated with the application TEE instance 210. The cryptographic measurement may include measurements of files, BIOS, bootloaders, virtual memory, components, images, internal configurations, current software or applications run by the TEE, etc. For example, components of the boot of the application TEE instance 210 may be cryptographically measured (e.g., each boot component may be measured either individually or collectively by computing the hash values of byte arrays representing the boot components). The measured values of the boot components may then be used to decide if the application TEE instance can be trusted. Additionally, the measurement or hash may represent a fingerprint of the measured files.

In another example, the cryptographic measurement may include a measurement value that is a hash value of the files associated with the application TEE instance. In another example, a cryptographic measurement may be taken from one or more of the application TEE images. The measurement may be compared to integrity records or attestation records from a reference measurement. In some cases, the measurement may also indicate the origin of the measured information, which may help attest that the origin of the information is a trusted source.

The secret 240B or key may involve symmetric encryption or asymmetric encryption. Symmetric encryption is an encryption process that uses a single key for both encryption and decryption. In symmetric encryption, the same key is available to multiple entities (e.g., nodes, escrow TEE instances 220A-C, etc.). Asymmetric encryption uses key pairs or key-secret pairs that may each include a private key and a public key. In an example, the private key is known only to a respective entity (e.g., escrow TEE instance 220B), and the public key is known to a group of entities in the network (e.g., each application TEE instance 210). An application TEE instance 210 may use the public key to encrypt data, and the encrypted data can be decrypted using the escrow TEE instances 220 private key.

The encryption and decryption may utilizing hashing functions such as the Secure Hash Algorithm ("SHA") (e.g., SHA-128, SHA-256, etc.) or other hashing functions such as MD5. For example, the secret 240A' or key may appear to be a random string of numbers and letters (e.g., 140FA9Z425ED694R018019B492). Additionally, the encryption and decryption processes may be performed according to the Advanced Encryption Standard ("AES"). AES is based on a design principle known as a substitution-permutation network, and may utilize keys with a key size of 128, 192, or 256 bits.

Figure 4:
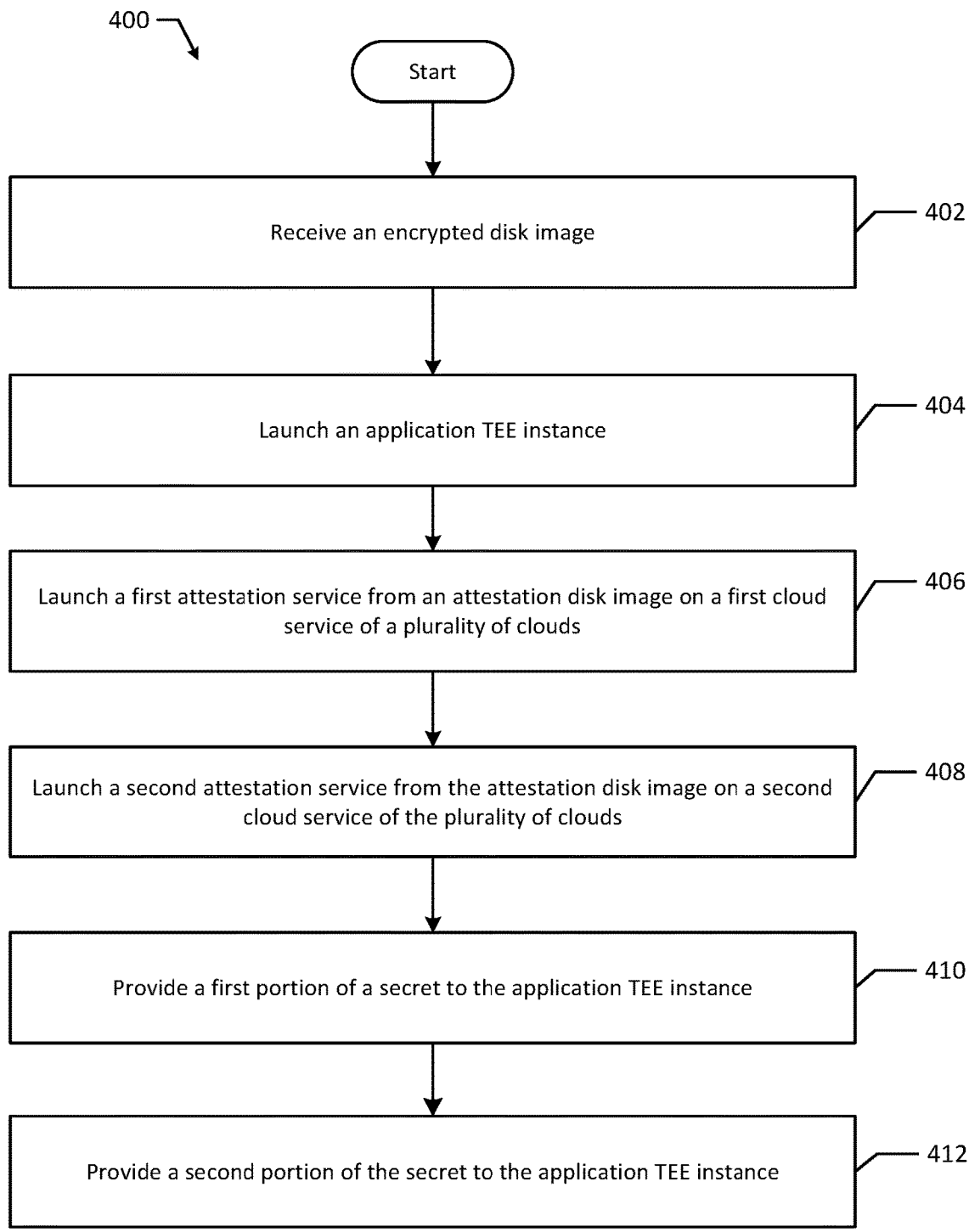
FIG. 4 illustrates a flowchart of an example process for secure and reliable launching of TEEs according to an example embodiment of the present disclosure.

FIG. 4 illustrates a flowchart of an example method 400 for secure and reliable launching of TEEs in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In the illustrated example, method 400 includes receiving an encrypted disk image (block 402). For example, a cloud service of a trusted cloud provider 202 may receive an encrypted disk image 280. While the encrypted disk image 280 is available to the trusted cloud provider 202, the encrypted disk image 280 may otherwise be unavailable to other cloud providers to provide additional security. The method 400 also includes launching an application TEE instance (block 404). For example, the cloud service may launch an application TEE instance 210. The application TEE instance 210 may be launched and pending full start-up until the application TEE instance 210 has been validated.

Method 400 also includes launching a first attestation service from an attestation disk image on a first cloud service of a plurality of clouds (block 406). For example, a first cloud service of a plurality of cloud services of at least one alternate cloud provider 240A-B may launch a first attestation service instance 299A from an attestation disk image. The attestation disk image may include a first portion 241 of a secret 240. Additionally, the method 400 includes launching a second attestation service from the attestation disk image on a second cloud service of the plurality of clouds (block 408). For example, a second cloud service of the plurality of clouds services of the at least one alternate cloud provider 240A-B, may launch a second attestation service instance 299B from the attestation disk image. The attestation disk image may include a second portion 243 of the secret. Additional attestation service instances (e.g., attestation service instance 299C) may also be launched on the same cloud service by the same alternate cloud provider or on a different public cloud by a different cloud provider.

Method 400 also includes providing a first portion of a second to the application TEE instance (block 410). For example, the first cloud service may provide the first portion 241 of the secret 240 to the application TEE instance 210. The escrow TEE instance 220A or its associated attestation service 299A may provide the first portion 241 of the secret 240 to the application TEE instance 210. Additionally, the method 400 includes providing a second portion of the secret to the application TEE instance (block 412). For example, the second cloud service may provide the second portion 243 of the secret 240 to the application TEE instance 210. The escrow TEE instance 220B or its associated attestation service 299B may provide the second portion 243 of the secret 240 to the application TEE instance 210. In an example, portion 241 and portion 243 may be sufficient to satisfy the threshold required to recover the entire secret 240.

Figure 5A:
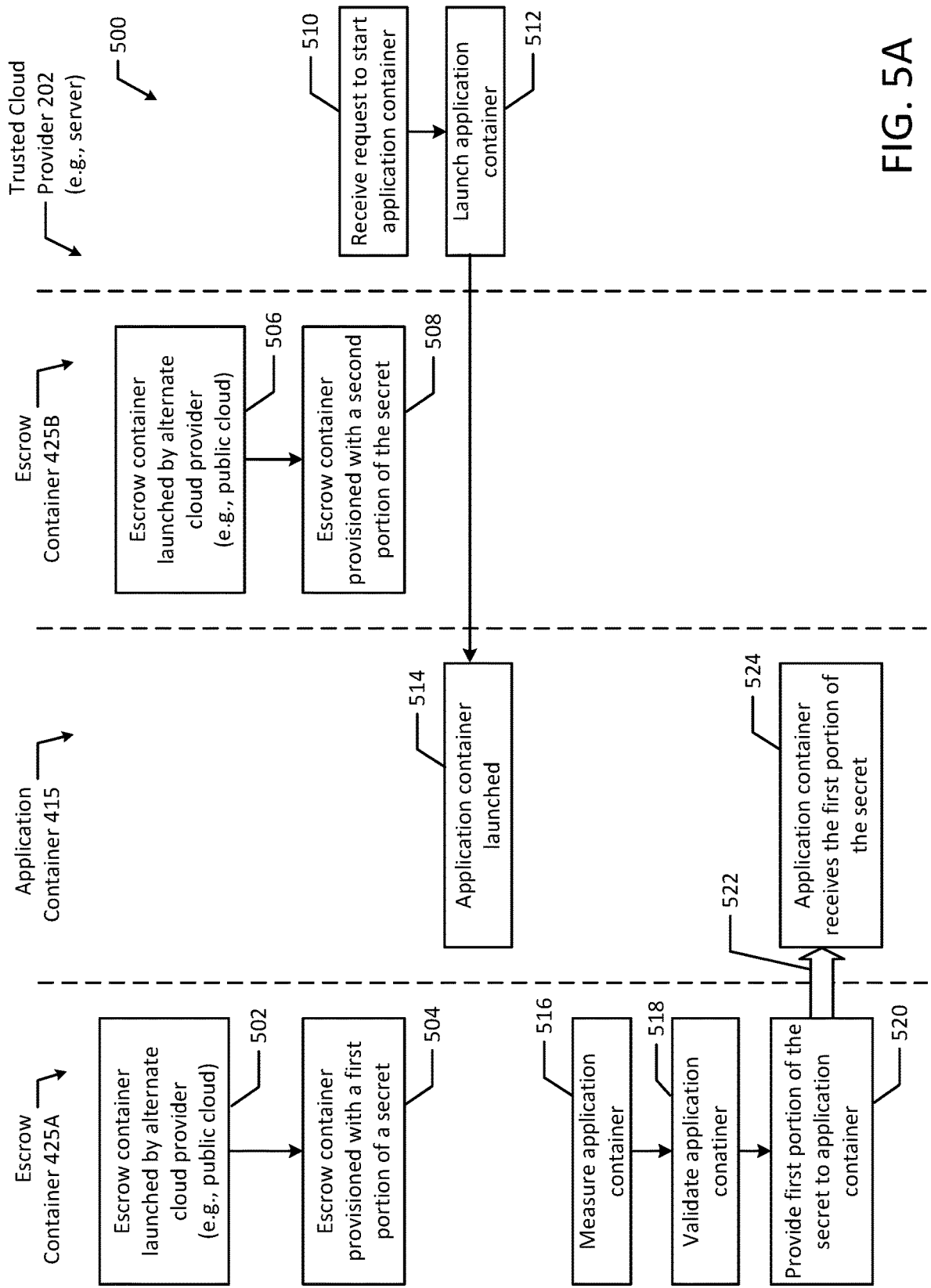
FIGS. 5A and 5B illustrate a flow diagram of an example process for securely and reliably launching TEE instances according to an example embodiment of the present disclosure.
Figure 5B:
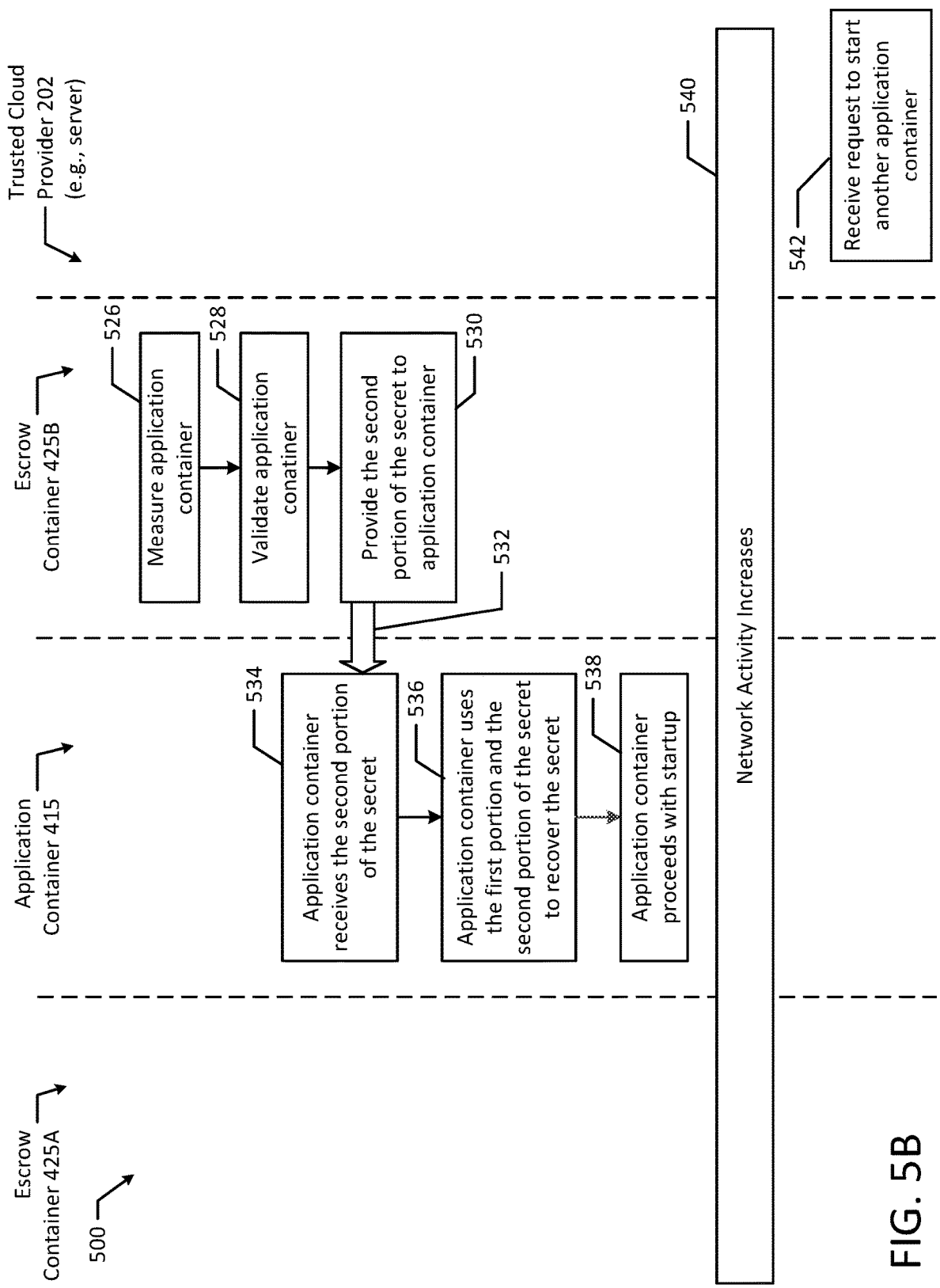

FIGS. 5A and 5B depict a flow diagram illustrating an example method 500 for securely and reliably launching TEE instances according to secret sharing scheme according an example embodiment of the present disclosure. Although the example method 500 is described with reference to the flow diagram illustrated in FIGS. 5A and 5B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, an application container 415, escrow containers 425A-B, and a trusted cloud provider 202 may communicate to perform example method 500.

The escrow container 425A is launched by an alternate cloud provider 204 (block 502). The escrow container 425A may be launched from an attestation disk image and may include an attestation service 299. In an example, the alternate cloud provider is a public cloud, such that attestation services 299 may be hosted outside of a private cloud. Then, the escrow container 425A is provisioned with a first portion 522 of a secret 240 (block 504). In an example, the attestation service 299 or the escrow container 425A may launch from an attestation disk image that includes the portion 522 of the secret 240. Similarly, another escrow container 425B is launched by an alternate cloud provider (block 506). The escrow container 425B may be launched from an attestation disk image and may include an attestation service 299. Then, the escrow container 425B is provisioned with a second portion of the secret (block 508). Similarly, the attestation service 299 or the escrow container 425B may launch from an attestation disk image that includes the portion 532 of the secret 240. The escrow containers 425A-B may be hosted on the same alternate public cloud. Alternatively, each escrow container 425A-B may be hosted by different alternate cloud providers on different clouds.

A trusted cloud provider 202 receives a request to start an application container 415 (block 510). A container owner may send a request to start an application due to increased traffic that requires additional application instances to handle the load. In other examples, the request to start the application may be to launch a new version or new release of the application in the cloud. In an example, the escrow containers 425A-B may already be launched and running on one or more alternate clouds. However, the escrow containers 425A-B may be launched responsive to receiving a request to start an application, such as an application container 415.

Additionally, the trusted cloud provider 202 launches the application container 415 (block 512). Then, the application container 415 is launched (block 514), but has not yet started providing runtime services. Even though application container 415 is launched and running, the container 415 has not yet been validated and therefore is not allowed to proceed with start-up. For example, validation or attestation may be required to ensure that the application containers 415 are authorized for deployment. Validation may provide an endorsement that the application container 415 was launched by a trusted platform and that the application container's code is endorsed by a trusted entity. Allowing an application container 415 to proceed with start-up without validating or attesting the application container 415 may allow untrusted applications (e.g., malicious applications) to start-up and cause security breaches.

The escrow container 425A measures the application container 415 (block 516). For example, the escrow container 425A may cryptographically measure the application container 415. The cryptographic measurement may include measurements of files, BIOS, bootloaders, virtual memory, components, images, internal configurations, current software or applications run by the TEE, etc. The escrow container 425A may perform measurements via an associated attestation service 299. Then, the escrow container 425A validates the application container 415 (block 518). For example, the escrow container 425 may validate the application container 415 based on the cryptographic measurement. Validation or attestation may occur if the cryptographic measurement matches a reference measurement. For example, if the cryptographic measurement produces a measurement value (e.g., hash value) that matches a trusted reference measurement, the escrow container 425 may determine that the application container 415 (e.g., clone or cloned container) is trustworthy.

After validating the application container 415, the escrow container 425A provides the first portion 522 of the secret 240 to the application container 415 (block 520). The application container 425A receives the first portion 522 of the secret 240 (block 524). The portion 522 of the secret 240 provided to the application container 415 may be the same portion that the escrow container 425A was provisioned with at block 504, but that is now stored in a different memory location. By providing the portion 522 of the secret 240 and attestation services through the escrow container 425A, the trusted cloud provider (e.g., private cloud) is protected for security threats associated with accessing the key or secret during attestation. The portion 522 of the secret 240 or key may involve symmetric encryption or asymmetric encryption. With asymmetric encryption, the portion 522 of the secret 240 or key may use key pairs or key-secret pairs. In an example, the encryption and decryption may utilizing hashing functions such as the Secure Hash Algorithm ("SHA") (e.g., SHA-128, SHA-256) or MD5. Additionally, the encryption and decryption processes may be performed according to the Advanced Encryption Standard ("AES") and may utilize keys or secrets 240 with a size of 128, 192, or 256 bits.

Similarly, the escrow container 425B measures the application container 415 (block 526). Then, the escrow container 425B validates the application container 415 (block 528). In an example, validation data may be shared between escrow containers 425A-B or attestation services 299A-B. For example, one escrow container (e.g., escrow container 425A) may perform the measurement and validation. If the cryptographic measurement and validation is confirmed, this result may be shared with other escrow containers in the system. After validating the application container 415, the escrow container 425B provides the second portion 532 of the secret to the application container 415 (block 530). The application container 425B receives the second portion 432 of the secret (block 534). In the illustrated example, two portions 522 and 532 are sufficient to meet the threshold for recovering the secret 240. For example, the secret 240 may have been split into three portions where any two of those portions (e.g., portion 522 and 532) are sufficient to recover the entire secret 240.

Then, the application container 415 uses the first portion 522 and the second portion 532 of the secret to recover the secret (block 536). As discussed above, the secret sharing may operate according to "Shamir's Secret Sharing", which is an algorithm where a secret 240 is divided into parts or portions, giving each participant (e.g., escrow containers 425A-B) its own unique portion 522, 532. To reconstruct or recover the original secret 240, a minimum number of portions is required, which is referred to as a threshold. After recovering the secret, the application container 415 proceeds with startup (block 538). For example, the application container 415 may start performing runtime services on the cloud. The recovered secret 240 may be configured such that saving the recovered secret is prohibited, which prevents the application container 415 from saving the secret 240 for later use. In an example, once the recovered secret 240 is used to finalize start-up of the application container 415, the trusted cloud provider 202 may no longer have access to the secret 240. When launching another application container 415, another validation or attestation process may be required to again gain access to the secret 240 or portions 522, 532 of the secret 240.

As illustrated in FIG. 5B, network activity increases (block 540). Increased network activity may require additional application containers to handle the increased network load. For example, the trusted cloud provider 202 may receive a request to start another application container (block 542). If network traffic increases again and additional application containers 415 need to be launched, the escrow containers 425A-B may validate additional application containers 415 or application instances that are launched on the cloud, which advantageously provides high availability to attestation or validation services without reducing security. For example, since access to the portions of the secret 240 and the encrypted disk image 280 used to launch application containers 415 are split between alternate cloud provider(s) (e.g., a public cloud) and a trusted cloud provider 202 (e.g., a private cloud), secrecy and reliability is improved with no single point of failure even if one of the attestation services fails or is infiltrated by an attacker.

As mentioned above, if there is a security breach with one of the escrow containers (e.g., escrow container 425A), those escrow containers (e.g., escrow container 425A) may be shut down and the application container 415 may recover the secret 240 from another portion of the secret 240 obtained from a different escrow container or another instance of an escrow container. For example, there may be multiple instances of each escrow container. Specifically, multiple escrow containers 425A-B may be launched and running at the same time such that if one of the escrow containers 425 crashes or goes off-line, another escrow container 425 may assume the responsibility of validating (e.g., attesting) application containers 415.

Figure 6:
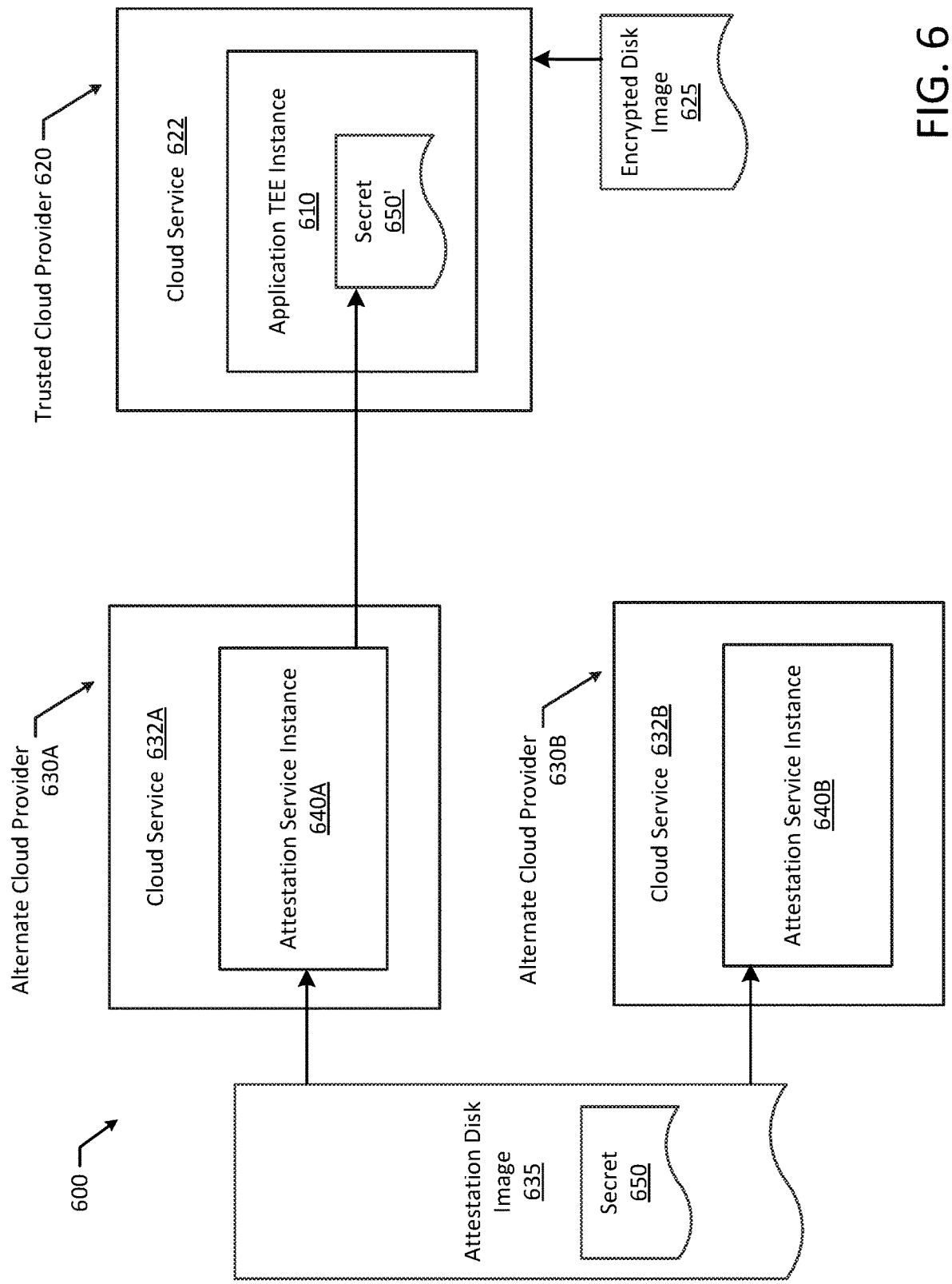
FIG. 6 illustrates a block diagram of an example application TEE launching system according to an example embodiment of the present disclosure.

FIG. 6 is a block diagram of an example application TEE launching system 600 according to an example embodiment of the present disclosure. The system 600 includes an application TEE instance 610 and a first cloud service 622 of a trusted cloud provider 620. The first cloud service is configured to receive an encrypted disk image 625 and the trusted cloud provider 620 has access to the encrypted disk image 625. The first cloud service 622 is also configured to launch the application TEE instance 610. The system 600 also includes a second cloud service 632A of a first alternate cloud provider 630A, which is configured to launch a first attestation service instance 640A from an attestation disk image 635. The attestation disk image 635 includes a secret 650, and the first alternate cloud provider 630A has access to the secret 650. The second cloud service 632A is also configured to provide the secret 635 to the application TEE instance 610. Additionally, the system 600 includes a third cloud service 632B of a second alternate cloud provider 630B, which is configured to launch a second attestation service instance 640B from the attestation disk image 635. The attestation disk image 635 includes the secret 650, and the second alternate cloud provider 630B has access to the secret 650. The third cloud service 632B is also configured to provide the secret 650 to the application TEE instance 610. One of the second cloud service 632A and the third cloud service 632B provide the secret 650 (the provided secret 650 or access to the secret 650 is illustrated as secret 650') to the application TEE instance 610 when the other of the second cloud service 632A and third cloud service 632B is unavailable.

By splitting access to the encrypted disk image 625 and the secret 650 between the trusted cloud provider 620 and alternate cloud providers 630A-B, additional security is provided such that security is increased compared to systems that solely rely on attestation services maintained in a private cloud. Additionally, when a private cloud's attestation services go off-line, validating newly launched application TEE instances 610 may be completely halted thereby preventing the application TEE instances 610 from fully starting up and performing runtime services (e.g., serving application requests). For example, relying solely on a private cloud adds another point of failure and may cause the application to perform poorly or even crash if the private cloud slows down or goes off-line. However, relying on several different public clouds improves reliability while maintaining security.

Figure 7:
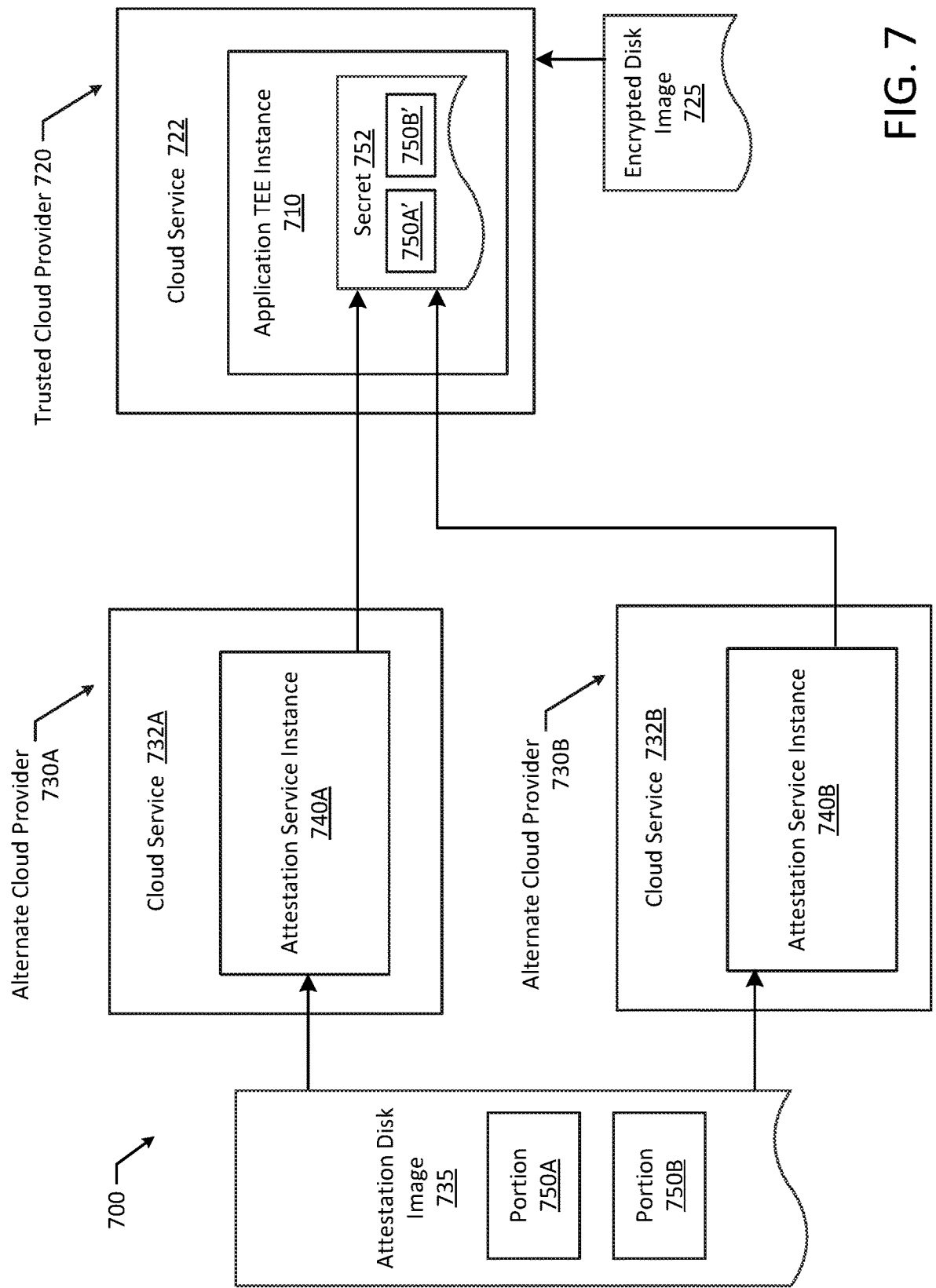
FIG. 7 illustrates a block diagram of an example application TEE launching system according to an example embodiment of the present disclosure.

FIG. 7 is a block diagram of an example application TEE launching system 700 according to an example embodiment of the present disclosure. The system 700 includes an application TEE instance 710 and a cloud service 722 of a trusted cloud provider 720. The cloud service 722 is configured to receive an encrypted disk image 725 and launch the application TEE instance 710. The system 700 also includes a first cloud service 732A of a plurality of cloud services 732A-B from at least one alternate cloud provider 730A-B, which is configured to launch a first attestation service instance 740A from an attestation disk image 735. The attestation disk image 735 includes a first portion 750A of a secret 752. The first cloud service 732A is also configured to provide the first portion 750A of the secret 752 to the application TEE instance 710. Additionally, the system 700 includes a second cloud service 732B of the plurality of cloud services 732A-B from the at least one alternate cloud provider 730A-B, which is configured to launch a second attestation service instance 740B from the attestation disk image 735. The attestation disk image includes a second portion 750B of the secret 752. The second cloud service 732B is also configured to provide the second portion 750B of the secret 752 to the application TEE instance 710 (the provided portions 750A and 750B of the secret 752 or access to the portions 750A-B of the secret 752 is illustrated as portions 750A' and 750B'). By using a secret sharing scheme where the secret 752 is divided into pieces or portions 750A-B, secrecy and reliability may be further improved.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes an application trusted execution environment ("TEE") instance and a first cloud service of a trusted cloud provider. The first cloud service is configured to receive an encrypted disk image and the trusted cloud provider has access to the encrypted disk image. The first cloud service is also configured to launch the application trusted execution environment (TEE) instance. The system also includes a second cloud service of a first alternate cloud provider, which is configured to launch a first attestation service instance from an attestation disk image. The attestation disk image includes a secret, and the first alternate cloud provider has access to the secret. The second cloud service is also configured to provide the secret to the application TEE instance. Additionally, the system includes a third cloud service of a second alternate cloud provider, which is configured to launch a second attestation service instance from the attestation disk image. The attestation disk image includes the secret, and the second alternate cloud provider has access to the secret. The third cloud service is also configured to provide the secret to the application TEE instance. One of the second cloud service and the third cloud service provide the secret to the application TEE instance when the other of the second cloud service and third cloud service is unavailable.

In a 2nd exemplary aspect of the present disclosure, which may be used in combination with any one or more of the preceding aspects (e.g., the 1st aspect), at least one of the second cloud service and the third cloud service is configured to obtain a cryptographic measurement associated with the application TEE instance.

In a 3rd exemplary aspect of the present disclosure, which may be used in combination with any one or more of the preceding aspects (e.g., the 2nd aspect), the cryptographic measurement identifies characteristics of the application TEE instance including at least one of a type of the TEE instance, a version of the TEE instance, and a description of software components loaded into the TEE instance.

In a 4th exemplary aspect of the present disclosure, which may be used in combination with any one or more of the preceding aspects (e.g., the 2nd aspect), the cryptographic measurement further includes an integrity code to validate the cryptographic measurement.

In a 5th exemplary aspect of the present disclosure, which may be used in combination with any one or more of the preceding aspects (e.g., the 2nd aspect), at least one of the second cloud service and the third cloud service is configured to validate the application TEE instance.

In a 6th exemplary aspect of the present disclosure, which may be used in combination with any one or more of the preceding aspects (e.g., the 5th aspect), the at least one of the second cloud service and the third cloud service is configured to provide the secret responsive to validating the application TEE instance.

In a 7th exemplary aspect of the present disclosure, which may be used in combination with any one or more of the preceding aspects (e.g., the 1st aspect), the application TEE instance is an encrypted virtual machine.

In an 8th exemplary aspect of the present disclosure, which may be used in combination with any one or more of the preceding aspects (e.g., the 1st aspect), the trusted cloud provider does not have access to the secret.

In a 9th exemplary aspect of the present disclosure, which may be used in combination with any one or more of the preceding aspects (e.g., the 1st aspect), the trusted cloud provider is restricted from accessing the secret.

In a 10th exemplary aspect of the present disclosure, which may be used in combination with any one or more of the preceding aspects (e.g., the 1st aspect), the first alternate cloud provider does not have access to the encrypted disk image.

In an 11th exemplary aspect of the present disclosure, which may be used in combination with any one or more of the preceding aspects (e.g., the 1st aspect), the first alternate cloud provider is restricted from accessing the encrypted disk image.

In a 12th exemplary aspect of the present disclosure, which may be used in combination with any one or more of the preceding aspects (e.g., the 1st aspect), the second alternate cloud provider does not have access to the encrypted disk image.

In a 13th exemplary aspect of the present disclosure, which may be used in combination with any one or more of the preceding aspects (e.g., the 1st aspect), the second alternate cloud provider is restricted from accessing the encrypted disk image.

In a 14th exemplary aspect of the present disclosure, which may be used in combination with any one or more of the preceding aspects (e.g., the 1st aspect), the second cloud service and the third cloud service are public clouds.

In a 15th exemplary aspect of the present disclosure, which may be used in combination with any one or more of the preceding aspects (e.g., the 1st aspect), the first cloud service is a private cloud.

Aspects of the subject matter described herein may be useful alone or in combination with one or more other aspects described herein. In a 16th exemplary aspect of the present disclosure a method includes uploading an encrypted disk image to a first cloud service of a trusted cloud provider. Additionally, the trusted cloud provider has access to the encrypted disk image. The method also includes launching an application trusted execution environment (TEE) instance on the first cloud service of a trusted cloud provider. Additionally, the method includes launching a first attestation service instance from an attestation disk image on a second cloud service of a first alternate cloud provider. The attestation disk image includes a secret, and the first alternate cloud provider has access to the secret. The method also includes launching a second attestation service instance from the attestation disk image on a third cloud service of a second alternate cloud provider. The attestation disk image includes the secret, and the second alternate cloud provider has access to the secret. Additionally, the method includes providing, by one of the second cloud service and the third cloud service, the secret to the application TEE instance when the other of the second cloud service and third cloud service is unavailable.

In a 17th exemplary aspect of the present disclosure, which may be used in combination with any one or more of the preceding aspects (e.g., the 16th aspect), the method further includes obtaining, by at least one of the second cloud service and the third cloud service, a cryptographic measurement associated with the application TEE instance.

In an 18th exemplary aspect of the present disclosure, which may be used in combination with any one or more of the preceding aspects (e.g., the 17th aspect), the cryptographic measurement identifies characteristics of the application TEE instance including at least one of a type of the TEE instance, a version of the TEE instance, and a description of software components loaded into the TEE instance.

In a 19th exemplary aspect of the present disclosure, which may be used in combination with any one or more of the preceding aspects (e.g., the 17th aspect), the cryptographic measurement further includes an integrity code to validate the cryptographic measurement.

In a 20th exemplary aspect of the present disclosure, which may be used in combination with any one or more of the preceding aspects (e.g., the 17th aspect), the method further includes validating, by at least one of the second cloud service and the third cloud service, the application TEE instance.

In a 21st exemplary aspect of the present disclosure, which may be used in combination with any one or more of the preceding aspects (e.g., the 20th aspect), the at least one of the second cloud service and the third cloud service provides the secret responsive to validating the application TEE instance.

In a 22nd exemplary aspect of the present disclosure, which may be used in combination with any one or more of the preceding aspects (e.g., the 16th aspect), the application TEE instance is an encrypted virtual machine.

In a 23rd exemplary aspect of the present disclosure, which may be used in combination with any one or more of the preceding aspects (e.g., the 16th aspect), the trusted cloud provider does not have access to the secret.

In a 24th exemplary aspect of the present disclosure, which may be used in combination with any one or more of the preceding aspects (e.g., the 16th aspect), the trusted cloud provider is restricted from accessing the secret.

In a 25th exemplary aspect of the present disclosure, which may be used in combination with any one or more of the preceding aspects (e.g., the 16th aspect), the first alternate cloud provider does not have access to the encrypted disk image.

In a 26th exemplary aspect of the present disclosure, which may be used in combination with any one or more of the preceding aspects (e.g., the 16th aspect), the first alternate cloud provider is restricted from accessing the encrypted disk image.

In a 27th exemplary aspect of the present disclosure, which may be used in combination with any one or more of the preceding aspects (e.g., the 16th aspect), the second alternate cloud provider does not have access to the encrypted disk image.

In a 28th exemplary aspect of the present disclosure, which may be used in combination with any one or more of the preceding aspects (e.g., the 16th aspect), the second alternate cloud provider is restricted from accessing the encrypted disk image.

Aspects of the subject matter described herein may be useful alone or in combination with one or more other aspects described herein. In a 29th exemplary aspect of the present disclosure a non-transitory machine-readable medium stores code, which when executed by a processor is configured to upload an encrypted disk image to a first cloud service of a trusted cloud provider. The trusted cloud provider has access to the encrypted disk image. The non-transitory machine-readable medium is also configured to launch an application trusted execution environment (TEE) instance on the first cloud service of a trusted cloud provider and launch a first attestation service instance from an attestation disk image on a second cloud service of a first alternate cloud provider. The attestation disk image includes a secret, and the first alternate cloud provider has access to the secret. Additionally, the non-transitory machine-readable medium is configured to launch a second attestation service instance from the attestation disk image on a third cloud service of a second alternate cloud provider. The attestation disk image includes the secret, and the second alternate cloud provider has access to the secret. The non-transitory machine-readable medium is also configured to provide the secret to the application TEE instance by one of the second cloud service and the third cloud service when the other of the second cloud service and third cloud service is unavailable.

Aspects of the subject matter described herein may be useful alone or in combination with one or more other aspects described herein. In a 30th exemplary aspect of the present disclosure a system includes a means for uploading an encrypted disk image to a first cloud service of a trusted cloud provider. The trusted cloud provider has access to the encrypted disk image. The system also includes a first means for launching an application trusted execution environment (TEE) instance on a first cloud service of a trusted cloud provider and a second means for launching a first attestation service instance from an attestation disk image on a second cloud service of a first alternate cloud provider. The attestation disk image includes a secret, and the first alternate cloud provider has access to the secret. Additionally, the system includes a third means for launching a second attestation service instance from the attestation disk image on a third cloud service of a second alternate cloud provider. The attestation disk image includes the secret, and the second alternate cloud provider has access to the secret. The system also includes a means for providing the secret to the application TEE instance.

In a 31st exemplary aspect of the present disclosure, which may be used in combination with any one or more of the preceding aspects (e.g., the 30th aspect), the first alternate cloud provider and the second alternate cloud provider are the same such that the second cloud service an third cloud service are different cloud services hosted by the same alternate cloud provider.

Aspects of the subject matter described herein may be useful alone or in combination with one or more other aspects described herein. In a 32nd exemplary aspect of the present disclosure a system includes an application trusted execution environment ("TEE") instance and a cloud service of a trusted cloud provider. The cloud service is configured to receive an encrypted disk image, and launch the application trusted execution environment (TEE) instance. The system also includes a first cloud service of a plurality of cloud services from at least one alternate cloud provider, which is configured to launch a first attestation service instance from an attestation disk image. The attestation disk image includes a first portion of a secret. The first cloud service is also configured to provide the first portion of the secret to the application TEE instance. Additionally, the system includes a second cloud service of the plurality of cloud services from the at least one alternate cloud provider, which is configured to launch a second attestation service instance from the attestation disk image. The attestation disk image includes a second portion of the secret. The second cloud service is also configured to provide the second portion of the secret to the application TEE instance.

In a 33rd exemplary aspect of the present disclosure, which may be used in combination with any one or more of the preceding aspects (e.g., the 32nd aspect), the first cloud service and the second cloud service are configured to obtain a cryptographic measurement associated with the application TEE instance.

In a 34th exemplary aspect of the present disclosure, which may be used in combination with any one or more of the preceding aspects (e.g., the 33rd aspect), the cryptographic measurement identifies characteristics of the application TEE instance including at least one of a type of the TEE instance, a version of the TEE instance, and a description of software components loaded into the TEE instance.

In a 35th exemplary aspect of the present disclosure, which may be used in combination with any one or more of the preceding aspects (e.g., the 33rd aspect), the cryptographic measurement further includes an integrity code to validate the cryptographic measurement.

In a 36th exemplary aspect of the present disclosure, which may be used in combination with any one or more of the preceding aspects (e.g., the 33rd aspect), the first cloud service and the second cloud service are configured to validate the application TEE instance.

In a 37th exemplary aspect of the present disclosure, which may be used in combination with any one or more of the preceding aspects (e.g., the 36th aspect), the first cloud service is configured to provide the first portion of the secret responsive to validating the application TEE instance.

In a 38th exemplary aspect of the present disclosure, which may be used in combination with any one or more of the preceding aspects (e.g., the 32nd aspect), the application TEE instance is an encrypted virtual machine.

In a 39th exemplary aspect of the present disclosure, which may be used in combination with any one or more of the preceding aspects (e.g., the 32nd aspect), the cloud service is restricted from accessing the first portion of the secret and the second portion of the secret.

In a 40th exemplary aspect of the present disclosure, which may be used in combination with any one or more of the preceding aspects (e.g., the 32nd aspect), the plurality of cloud services are restricted from accessing the encrypted disk image.

In a 41st exemplary aspect of the present disclosure, which may be used in combination with any one or more of the preceding aspects (e.g., the 32nd aspect), the first cloud service is restricted from accessing the second portion of the secret.

In a 42nd exemplary aspect of the present disclosure, which may be used in combination with any one or more of the preceding aspects (e.g., the 32nd aspect), the plurality of cloud services are public clouds.

In a 43rd exemplary aspect of the present disclosure, which may be used in combination with any one or more of the preceding aspects (e.g., the 32nd aspect), the cloud service is a private cloud.

In a 44th exemplary aspect of the present disclosure, which may be used in combination with any one or more of the preceding aspects (e.g., the 32nd aspect), the application TEE instance is configured to combine the first portion of the secret and the second portion of the secret to recover a complete secret.

In a 45th exemplary aspect of the present disclosure, which may be used in combination with any one or more of the preceding aspects (e.g., the 44th aspect), the application TEE instance is configured to complete start up by accessing the encrypted disk image using the complete secret.

Aspects of the subject matter described herein may be useful alone or in combination with one or more other aspects described herein. In a 46th exemplary aspect of the present disclosure a method includes receiving, by a cloud service of a trusted cloud provider, an encrypted disk image and launching, by the cloud service, an application trusted execution environment (TEE) instance. The method also includes launching, by a first cloud service of a plurality of cloud services of at least one alternate cloud provider, a first attestation service instance from an attestation disk image. The attestation disk image includes a first portion of a secret. Additionally, the method includes launching, by a second cloud service of the plurality of cloud services of the at least one alternate cloud provider, a second attestation service instance from the attestation disk image. The attestation disk image includes a second portion of the secret. The method also includes providing, by the first cloud service, the first portion of the secret to the application TEE instance and providing, by the second cloud service, the second portion of the secret to the application TEE instance.

In a 47th exemplary aspect of the present disclosure, which may be used in combination with any one or more of the preceding aspects (e.g., the 46th aspect), the method further includes obtaining, by at least one of the first cloud service and the second cloud service, a cryptographic measurement associated with the application TEE instance.

In a 48th exemplary aspect of the present disclosure, which may be used in combination with any one or more of the preceding aspects (e.g., the 46th aspect), the method further includes validating, by at least one of the first cloud service and the second cloud service, the application TEE instance.

In a 49th exemplary aspect of the present disclosure, which may be used in combination with any one or more of the preceding aspects (e.g., the 48th aspect), the first cloud provider forwards validation information to the second cloud provider.

In a 50th exemplary aspect of the present disclosure, which may be used in combination with any one or more of the preceding aspects (e.g., the 48th aspect), the at least one of the first cloud service and the second cloud service provides the secret responsive to validating the application TEE instance.

In a 51st exemplary aspect of the present disclosure, which may be used in combination with any one or more of the preceding aspects (e.g., the 46th aspect), the method further includes combining, by the application TEE instance, the first portion of the secret and the second portion of the secret to recover a complete secret.

In a 52nd exemplary aspect of the present disclosure, which may be used in combination with any one or more of the preceding aspects (e.g., the 51st aspect), the method further includes accessing, by the application TEE instance, the encrypted disk image using the complete secret. Additionally, the method includes completing, by the application TEE instance, start up.

Aspects of the subject matter described herein may be useful alone or in combination with one or more other aspects described herein. In a 53rd exemplary aspect of the present disclosure a non-transitory machine-readable medium stores code, which when executed by a processor is configured to receive an encrypted disk image, launch an application trusted execution environment (TEE) instance, and launch a first attestation service instance from an attestation disk image. The attestation disk image includes a first portion of a secret. The non-transitory machine-readable medium is also configured to launch a second attestation service instance from the attestation disk image. The attestation disk image includes a second portion of the secret. Additionally, the non-transitory machine-readable medium is also configured to provide the first portion of the secret to the application TEE instance and provide the second portion of the secret to the application TEE instance.

Aspects of the subject matter described herein may be useful alone or in combination with one or more other aspects described herein. In a 54th exemplary aspect of the present disclosure a system includes a means for receiving an encrypted disk image, a first means for launching an application trusted execution environment (TEE) instance, and a second means for launching a first attestation service instance from an attestation disk image. The attestation disk image includes a first portion of a secret. Additionally, the system includes a third means for launching a second attestation service instance from the attestation disk image. The attestation disk image includes a second portion of the secret. The system also includes a first means for providing the first portion of the secret to the application TEE instance and a second means for providing the second portion of the secret to the application TEE instance.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
an application trusted execution environment ("TEE") instance;
a first cloud service of a trusted cloud provider, wherein the first cloud service is configured to:
receive an encrypted disk image, wherein the trusted cloud provider has access to the encrypted disk image, and
launch the application trusted execution environment instance;
a second cloud service of a first alternate cloud provider configured to:
launch a first attestation service instance from an attestation disk image, wherein the attestation disk image includes a secret, and the first alternate cloud provider has access to the secret, and
provide the secret to the application TEE instance; and
a third cloud service of a second alternate cloud provider configured to:
launch a second attestation service instance from the attestation disk image, wherein the attestation disk image includes the secret, and the second alternate cloud provider has access to the secret, and
provide the secret to the application TEE instance; and
wherein one of the second cloud service and the third cloud service provide the secret to the application TEE instance when the other of the second cloud service and third cloud service is unavailable.

2. The system of claim 1, wherein at least one of the second cloud service and the third cloud service is configured to obtain a cryptographic measurement associated with the application TEE instance.

3. The system of claim 2, wherein the cryptographic measurement identifies characteristics of the application TEE instance including at least one of a type of the TEE instance, a version of the TEE instance, and a description of software components loaded into the TEE instance.

4. The system of claim 2, wherein the cryptographic measurement further includes an integrity code to validate the cryptographic measurement.

5. The system of claim 2, wherein at least one of the second cloud service and the third cloud service is configured to validate the application TEE instance.

6. The system of claim 5, wherein the at least one of the second cloud service and the third cloud service is configured to provide the secret responsive to validating the application TEE instance.

7. The system of claim 1, wherein the application TEE instance is an encrypted virtual machine, the trusted cloud provider is restricted from accessing the secret, the first alternate cloud provider is restricted from accessing the encrypted disk image, and the second alternate cloud provider is restricted from accessing the encrypted disk image.

8. The system of claim 1, wherein the second cloud service and the third cloud service are public clouds, and wherein the first cloud service is a private cloud.

9. A method comprising:
uploading an encrypted disk image to a first cloud service of a trusted cloud provider, the trusted cloud provider has access to the encrypted disk image;
launching an application trusted execution environment ("TEE") instance on the first cloud service of a trusted cloud provider;
launching a first attestation service instance from an attestation disk image on a second cloud service of a first alternate cloud provider, wherein the attestation disk image includes a secret, wherein the first alternate cloud provider has access to the secret;
launching a second attestation service instance from the attestation disk image on a third cloud service of a second alternate cloud provider, wherein the attestation disk image includes the secret, wherein the second alternate cloud provider has access to the secret; and
providing, by one of the second cloud service and the third cloud service, the secret to the application TEE instance when the other of the second cloud service and third cloud service is unavailable.

10. The method of claim 9, further comprising obtaining, by at least one of the second cloud service and the third cloud service, a cryptographic measurement associated with the application TEE instance.

11. The method of claim 10, further comprising validating, by at least one of the second cloud service and the third cloud service, the application TEE instance.

12. The method of claim 11, wherein the at least one of the second cloud service and the third cloud service provides the secret responsive to validating the application TEE instance.

13. A method comprising:
receiving, by a cloud service of a trusted cloud provider, an encrypted disk image;
launching, by the cloud service, an application trusted execution environment (TEE) instance;
launching, by a first cloud service of a plurality of cloud services of at least one alternate cloud provider, a first attestation service instance from an attestation disk image, wherein the attestation disk image includes a first portion of a secret;
launching, by a second cloud service of the plurality of cloud services of the at least one alternate cloud provider, a second attestation service instance from the attestation disk image, wherein the attestation disk image includes a second portion of the secret;

providing, by the first cloud service, the first portion of the secret to the application TEE instance; and providing, by the second cloud service, the second portion of the secret to the application TEE instance.

14. The method of claim 13, further comprising obtaining, by at least one of the first cloud service and the second cloud service, a cryptographic measurement associated with the application TEE instance.

15. The method of claim 13, further comprising validating, by at least one of the first cloud service and the second cloud service, the application TEE instance.

16. The method of claim 15, wherein the first cloud service forwards validation information to the second cloud service.

17. The method of claim 15, wherein the at least one of the first cloud service and the second cloud service provides the secret responsive to validating the application TEE instance.

18. The method of claim 13, further comprising combining, by the application TEE instance, the first portion of the secret and the second portion of the secret to recover a complete secret.

19. The method of claim 18, further comprising:

accessing, by the application TEE instance, the encrypted disk image using the complete secret; and completing, by the application TEE instance, start up.

20. The method of claim 13, further comprising:

obtaining, by the first attestation service instance, a first cryptographic measurement associated with the application TEE instance; and obtaining, by the second attestation service instance, a second cryptographic measurement associated with the application TEE instance.

* * * * *